United States Patent [19]
Kruschinski

[11] Patent Number: 5,974,485
[45] Date of Patent: Oct. 26, 1999

[54] ARRANGEMENT AND METHOD FOR IMPROVING THE DATA INTEGRITY WITH A RING BUFFER

[75] Inventor: Marcus Kruschinski, Berlin, Germany

[73] Assignee: Francotyp-Postalia AG & Co., Birkenwerder, Germany

[21] Appl. No.: 08/971,707

[22] Filed: Nov. 17, 1997

[30] Foreign Application Priority Data

Nov. 26, 1996 [DE] Germany ............ 196 50 993

[51] Int. Cl.[6] ................................................ G06F 13/00
[52] U.S. Cl. ............................................ 710/52; 711/110
[58] Field of Search ...................... 710/52–57; 711/110; 714/5–6, 15, 805; 705/402–406

[56] References Cited

U.S. PATENT DOCUMENTS

| | | | |
|---|---|---|---|
| 4,584,647 | 4/1986 | Eckert | 705/405 |
| 4,675,841 | 6/1987 | Check, Jr. et al. | 705/402 |
| 4,802,117 | 1/1989 | Chrosny et al. | 714/5 |
| 5,021,963 | 6/1991 | Brown et al. | 705/405 |
| 5,109,507 | 4/1992 | Check, Jr. | 714/6 |
| 5,280,438 | 1/1994 | Kanemaru | 364/561 |
| 5,398,330 | 3/1995 | Johnson | 714/15 |
| 5,495,599 | 2/1996 | Nishiyama | 714/56 |
| 5,577,055 | 11/1996 | Westerlund | 714/805 |
| 5,765,187 | 6/1998 | Shimizu et al. | 711/110 |

FOREIGN PATENT DOCUMENTS

| | | |
|---|---|---|
| 0 019 515 | 11/1987 | European Pat. Off. . |
| 0 615 211 | 9/1994 | European Pat. Off. . |
| PS 42 17 830 | 1/1996 | Germany . |
| 2 282 473 | 4/1995 | United Kingdom . |

*Primary Examiner*—Christopher B. Shin
*Attorney, Agent, or Firm*—Hill & Simpson

[57] ABSTRACT

In a method and apparatus for improving data integrity using a ring buffer, a ring buffer is formed by at least one of the memory areas of a non-volatile read-write memory being administered by a pointer counter such that a ring buffer that can be read out and written is produced in a non-volatile read-write memory. The ring buffer composed of a number of memory cells needed for conventional operation, expanded by one additional memory cell, and a cyclical pointer counter. The oldest dataset is overwritten in a write operation, and whereby the pointer counter is incremented after the new dataset was written into a memory cell in which the oldest dataset was previously located, so that the pointer of the aforementioned pointer counter now points to a memory cell having what is now an oldest dataset that can be overwritten in the next write operation. A microprocessor connected to the memory in which the ring buffer is formed is programmed to ignore the respective memory cell to which the pointer points for any and all read accesses. The readout of a dataset from the other memory cells, however, is enabled.

16 Claims, 3 Drawing Sheets

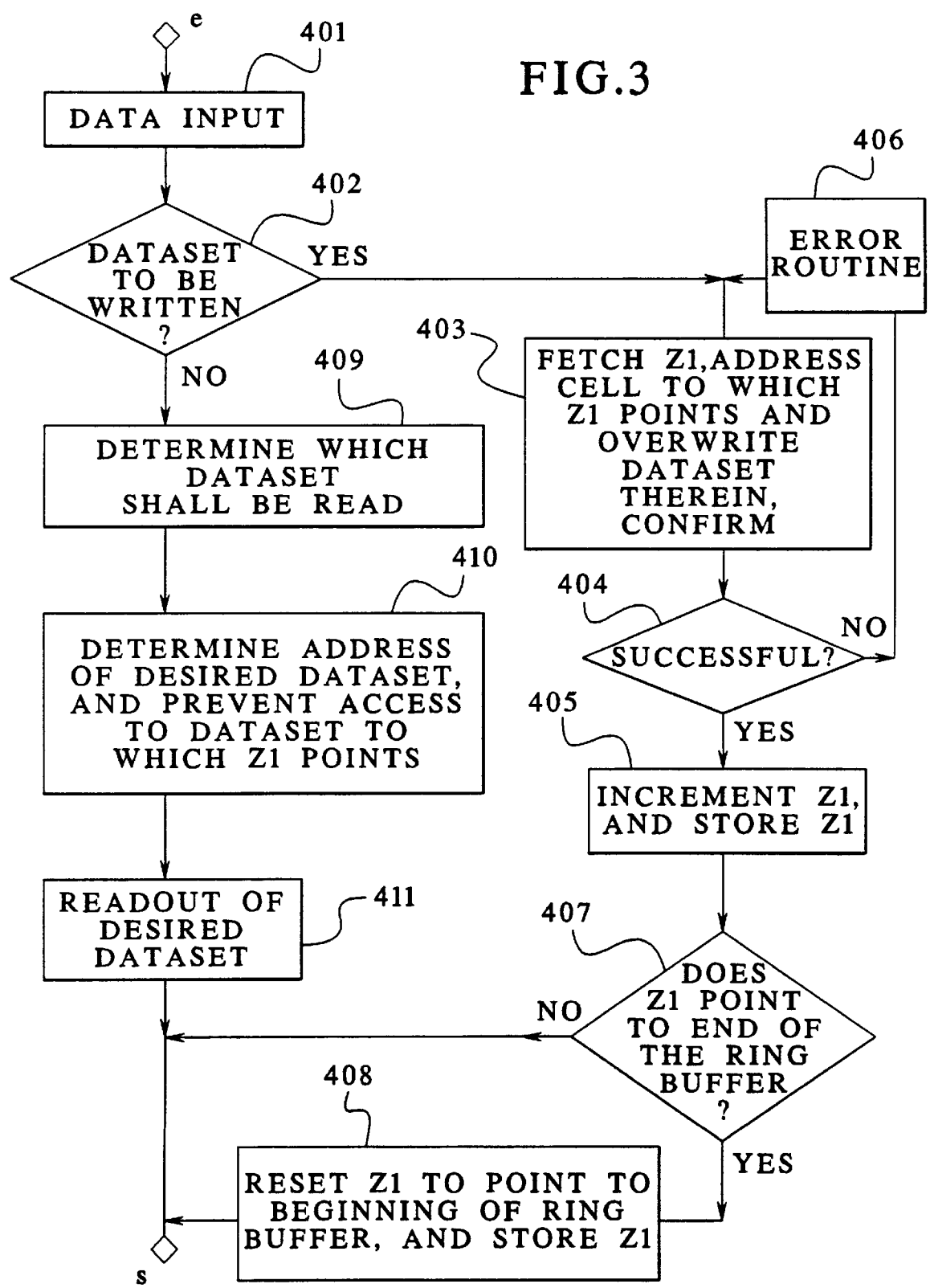

ARRANGEMENT AND METHOD FOR IMPROVING THE DATA INTEGRITY WITH A RING BUFFER

BACKGROUND OF THE INVENTION

1. Field of the Invention

The present invention is directed to an apparatus and a method for improving data integrity using a ring buffer.

2. Description of the Prior Art

Read-write memories are utilized for non-volatile storage for improving the data integrity of memories, as is required for data processing and similar devices and, in particular, for postage meter machines. These memories have memory areas with a number of cells for datasets, which number is usually larger than the number of datasets to be stored.

A high dependability in the storage of datasets is required in the use of such memories in postage meter machines so that, for example, errors in the debiting of monetary data that could result in high secondary costs are avoided. As is known, such dependability is enhanced by a redundant storage of data (U.S. Pat. No. 4,675,841, U.S. Pat. No. 5,109,507, U.S. Pat. No. 5,021,963, and European Patent 0 19 515).

German PS 42 17 830 discloses a method for the operation of a data processing system, wherein the data processing system processes at least one critical control or program section in a program routine that initiates the writing of information into a first non-volatile memory. A second non-volatile memory for redundant storage of data and a third non-volatile memory for storing a status identifier are present in addition to the first non-volatile memory. Preceding an uncritical control section, that does not initiate any writing of information into the first or second non-volatile memory, a status identifier of zero is entered into the third non-volatile memory in order to identify the following control section as uncritical. A pointer counter is incremented to enter a status identifier deviating from zero in order to thus identify the beginning of the next critical control section that initiates the writing of information into the first non-volatile memory. The processing thereof is followed by another critical control section for redundant storage. The pointer counter is incremented to a corresponding status identifier in order to identify the beginning of the further critical control section that initiates the writing of information into the second non-volatile memory. After the processing thereof, the pointer counter is in turn set to the initial condition, i.e. the status identifier zero is set, and the program routine is ended. A determination can be made on the basis of the status identifier at every voltage return (following a voltage drop, as may occur occasionally) as to whether the processing of a critical control section was interrupted in order to complete the processing thereof, i.e., in order to implement the reconstruction of the old dataset.

Upon an abort of a roll-in event, for example due to fades in the power supply, memory errors can also arise in the status identifier for a critical control section. By redundantly storing the status identifier and assuming that the correct status identifiers are in the majority, a decision about which status identifier is the correct one can be made with a majority check. A determination as to whether the values belong to a valid value range is made in the plausibility check.

A high memory requirement (capacity) is thus needed in such a non-volatile read-write memory, without such capacity being available for more datasets to be stored. In rare instances, however, errors are also conceivable wherein the values belong to a valid value range and also represent the majority but nonetheless represent an invalid or incorrect status identifier. A conversion of the correct datasets into incorrect datasets would then ensue given return of the voltage. The division of a program into critical and uncritical areas, moreover is work-intensive and subject to error in view of program modifications that are often subsequently introduced. Additional preventative measures are required for interruptions that do not occur due to voltage outages. Disadvantageously, control sections must still be processed to completion after the return of the voltage, or upon re-activation.

On the other hand, the aforementioned problem does not even arise when the debiting operations just implemented are reliably terminated (German PS 24 38 055). An error during storage is thus avoided from the very outset, so that the problem is not even allowed to arise. This approach, however, requires means for the recognition of an impending voltage outage and for ending an operation. Expensive hardware that only reacts to a voltage outage is utilized therefor.

Another known method employs means for recognizing a destroyed or disturbed dataset (European Application 0 615 211) and another recognizes a destroyed memory cell (European Patent 0 226 205). This demands a relatively high memory requirement in the program memory for the error recognition and correction routines, or for re-addressing the memory cells of the non-volatile memory.

SUMMARY OF THE INVENTION

An object of the present invention is to provide an apparatus and a method for improving data integrity using a ring buffer, wherein uncomplicated circuitry and steps are employed in order to cancel errors that arise due to abort of the roll-in operation. No correction or repair whatsoever of the datasets should be required after an interrupted write operation, or after return of the voltage.

A further object is to provide such an apparatus and method which function without a need for recognition of an impending voltage outage and with no additional preventative measures for interruptions that do not occur due to voltage outages. The method and apparatus should be applicable to operations other than accounting operations. An overwriting of the memory cells with new datasets should ensue cyclically when the turn for this overwriting of the appertaining memory cell has again arisen in the cycle.

The above object is achieved in accordance with the principles of the present invention in a method and apparatus for improving the data integrity in a system, employing a ring buffer formed in memory areas of a non-volatile read-write memory, administered by a pointer counter, with a specific number of identically formatted datasets being respectively stored in the memory areas, with a microprocessor connected to the ring buffer for controlling the reading and writing of data therein, wherein the ring buffer is composed of one additional memory cell than is necessary for conventional operation of the ring buffer, and wherein a pointer counter operates the pointer to designate an oldest dataset, which is then overwritten in a write operation, after which the pointer counter is incremented to then designate the memory cell of the ring buffer in which the now oldest dataset is located, and wherein the microprocessor is programmed to ignore the memory cell to which the pointer is currently pointing for any and all read accesses.

Read-write memories can be utilized for the non-volatile storage. As noted earlier, these memories have memory areas with a number of memory cells for datasets, which is usually larger than the number of datasets to be stored so that a ring buffer arises when at least one of the memory areas is administered by a counter and a specific number of identical datasets is stored in the memory area. A microprocessor is correspondingly programmed with a program memory, so that a ring buffer that can be read out and written arises in the non-volatile read-write memory. The ring buffer of the invention has one memory cell more than is required for conventional operation.

As used herein, the term "memory cell" means an addressable memory sub-area for one or more bytes. The pointer counter reading is incremented after a new dataset has been written into a memory cell having the oldest dataset in order to overwrite the oldest dataset. The pointer now points to a memory cell having what is now an oldest dataset that is allowed to be overwritten. This is the only dataset that would be destroyed given an abort of the storage routine. This memory cell therefore can be ignored for any and all read accesses, even when no abort of the storage operation occurs and no dataset was destroyed before the overwriting. An unsuccessful overwriting of the dataset to which the pointer points leads to an error routine, possibly with a repetition of the write operation. The incrementing of the pointer counter ensues only given a successfully stored, and thus correct, dataset. The stored dataset becomes valid as a result of the incrementing of the pointer counter after the successful storage operation. A read inhibit for that dataset to which the pointer is pointing prevents a write error during writing of the new dataset from taking effect upon readout. The inventive method includes incrementing the pointer counter reading after the storage of a dataset into a selected memory cell of a ring buffer and preventing the readout of a dataset from the memory cell to which the pointer is pointing. Regardless of how many datasets must be stored, and thus regardless of the number of memory cells, the inventive method and apparatus employ only one additional memory cell. The expansion of the memory capacity of the non-volatile memory in which the ring buffer is formed thus becomes proportionally smaller as the number of memory cells of the ring buffer increases.

The incrementing of the counter reading can ensue by means of a processor instruction within a clock cycle. Hardware assuring a complete processing of at least the instruction currently being processed by the processor can be a component of the microprocessor or a separate assembly that is connected to the microprocessor.

DESCRIPTION OF THE DRAWINGS

FIG. 3 is a flowchart for the operation of the ring buffer in accordance with the invention.

DESCRIPTION OF THE PREFERRED EMBODIMENTS

Figure 1:
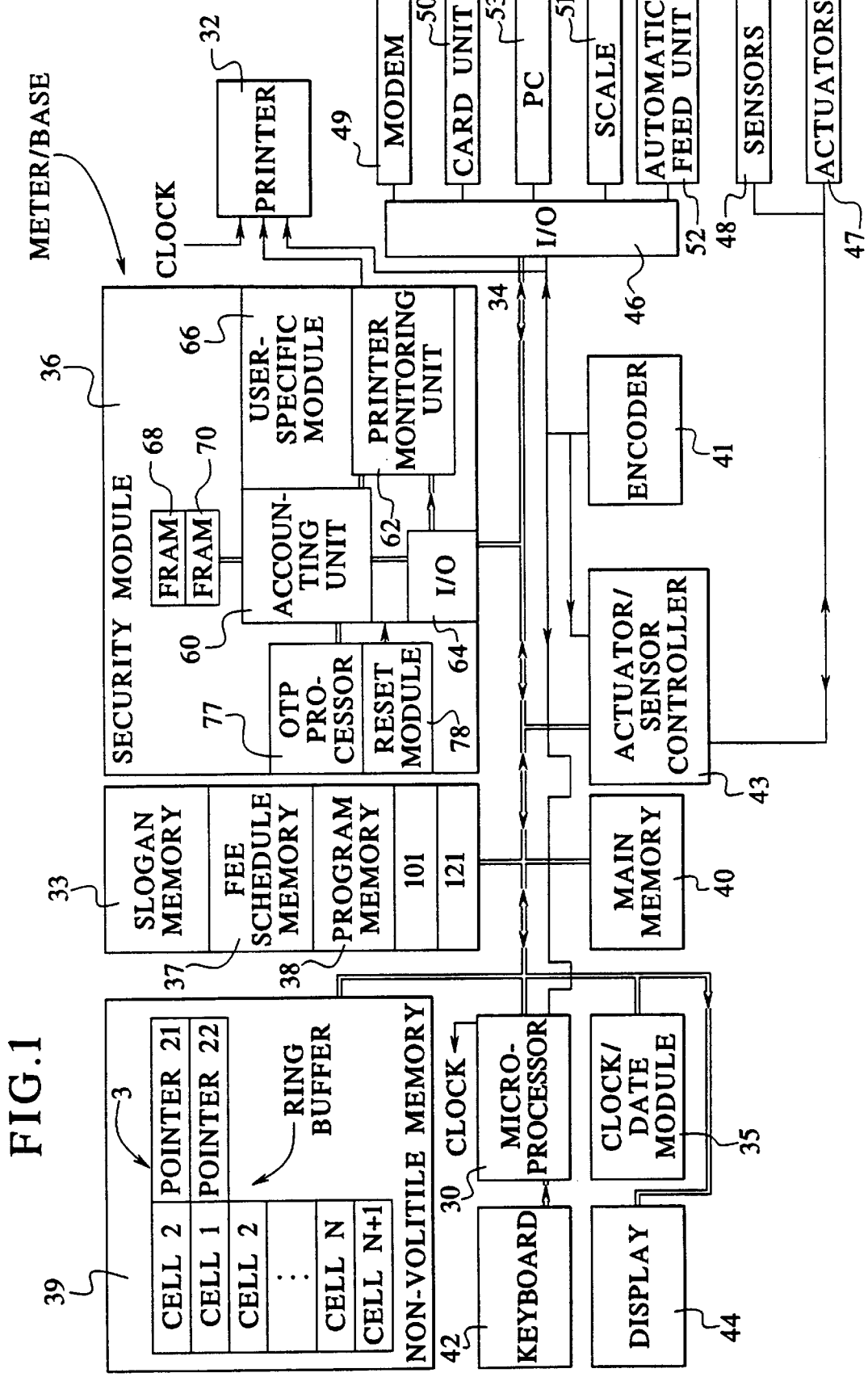
FIG. 1 is a block diagram of a postage meter machine having a non-volatile memory that is operated as ring buffer in accordance with the invention.

For non-volatile storage, a read-write memory 39 is connected to a microprocessor (CPU) 30. FIG. 1 shows an arrangement for a postage meter machine having a non-volatile memory 39 that is inventively operated as a ring buffer. The memory 39 has memory areas with a larger number of memory cells for datasets than the number of datasets to be stored. The microprocessor 30 is coupled in a standard way to a volatile main memory (RAM) 40 that stores the working variables, pixel data, and forms the compiling area for the various tasks, or the microprocessor 30 can be equipped with an internal RAM. The microprocessor 30 is connected to a program memory (ROM) 38, or can be equipped with an internal ROM, with which the microprocessor 30 is correspondingly programmed so that a ring buffer arises in the non-volatile read-write memory 39. For example, the non-volatile read-write memory 39 can be an NV-CMOS-RAM or an $E^2PROM$. The microprocessor 30 is correspondingly programmed in order to form a cyclical counter and for administering at least one of the memory areas with the counter, so that a specific number of identical datasets can be stored in the aforementioned memory area. Further, a slogan (cliche) printing block memory 33 (which may be an $E^2PROM$), a battery-supported clock/date module 35, a postage fee schedule memory 37, (which may be $E^2PROM$) as well as input units and output units are connected to the microprocessor CPU 30. One input unit a keyboard 42. Another (not shown) can be a modem or a chip card write/read unit, which may and also function as an output unit. One output unit is a display unit 44, for example an LCD display with an appertaining controller, and a further output unit is a printer 32, particularly an internal printer of the postage meter machine, that does not move during printing and with which at least one franking stamp imprint can be printed on postal matter. The accounting can ensue separately in a security module 36, as disclosed in greater detail in German Patent Application P 196 03 467.1 entitled "Frankiermaschine" (which was published after the convention priority date of the present application, which corresponds to co-pending U.S. application Ser. No. 08/788,188, filed Jan. 24, 1997). The security module 36 includes an OTP (onetime programmable) processor 77, a reset module 78 for starting given return of voltage, and a user-specific module 66 with an accounting or debiting unit 60 as well as with connected FRAM memories 68 and 70. Via a bus 34 in the base of the apparatus, accounting data are communicated to the interface of the user-specific module 66 and proceed therefrom to the accounting unit 60 that undertakes the accounting hardware-wise. The printing data are also communicated to the print head of the printer 32 via an interface 64 and printer-monitoring unit 62 of the user-specific module 66. Another embodiment of a postage meter machine described in European Application 0 716 398 provides a suitable OTP processor with non-volatile memory for accounting instead of the security module and provides an ASIC in the interface to the base with printing data control. The microprocessor 30 is preferably arranged in the meter portion of the postage meter machine and is in communication with a postage meter machine-internal interface to the base, particularly with an actuator/sensor controller 43 (supplied with signals from actuators 47 and sensors 48), and with an encoder 41 for determining the conveying speed of the postal matter, as is fundamentally disclosed in European Application 0 716 398. One of the actuators is a letter sensor that determines when a letter or other postal matter has reached the printing position, whereby letter thicknesses up to 20 mm are possible. Given greater thicknesses of the postal matter, franking can be carried out with a tape generator (not shown) for metered tapes which is likewise connected to the microprocessor 30 via the actuator/sensor controller 43. Moreover, an I/O unit 46 is also provided, having with interfaces for a modem 49 and/or a chip card write-read unit 50 and system interfaces for the coupling of other external devices, for example an external scale 51, an automatic postal matter feeder 52, a postal matter receptacle or a personal computer PC 53.

The hardware-oriented accounting is fast and manipulation-proof, so that no accounting errors can arise. Nonetheless, the postage meter machine is such a complicated device that errors can still occur, particularly in conjunction with the conveying and the printing on the postal matter, but these can be eliminated. Despite the presence of errors, thus, the postage meter machine can still be operated for some time if these are not all that serious so that the postage meter machine must be immediately inhibited for continued operation. An inventive ring buffer 3, for example, is preferably utilized in the error storage for the last twenty errors, so that the postage meter machine can be analyzed by the service technician on the basis of these errors when necessary. Hardware and/or software unit 100 and 101 are provided in conjunction with the processor 30 in order to form a cyclical pointer counter and the ring buffer 3. The non-volatile read-write memory 39 contains memory cells 1 through N for n datasets of, for example, x datasets and inventively comprises an additional memory cell N+1. The microprocessor 30 is correspondingly programmed by a program 101 stored in the program memory 38 in order, for example, to form the cyclical pointer counter for a first pointer Z1.

The pointer counter reading of the pointer Z1 can be non-volatilely stored in a memory cell Z of the read-write memory 39. In one version (not shown), the cyclical pointer counter is realized with the hardware unit 100 and is coupled to the non-volatile read-write memory 39. The hardware unit 100 can be separately arranged or can be a component of the microprocessor 30.

A further pointer counter with a second pointer Z2 is also provided for reading out the data from the other memory cells. The pointer counter for reading the data out from the memory cells is preferably formed by hardware and/or software units 120 and 121 of the microprocessor 30 and the program memory 38, respectively. The pointer counter reading of the further counter Z2 can be non-volatilely stored in a further memory cell (not shown) in the read-write memory 39 or can be volatilely stored in the main memory RAM 40 as warranted. The microprocessor 30 is correspondingly programmed by a program 121 stored in the program memory 38 in order to ignore the respective memory cell to which the pointer Z1 of the cyclical pointer counter is currently pointing for any and all read accesses. The (such as error data) stored in the ring buffer 3 can be individually called (retrieved) for readout, for example via a menu, and can be displayed on the display 44 when a corresponding code is entered via the keyboard by a service technician. In another preferred version, the aforementioned error data stored in the ring buffer 3 can be printed out with the internal printer of the postage meter machine. Given a faulty printer, the ring buffer 3 can also be read out via an interface with a service computer in order to automatically prepare a diagnosis as to what parts of the postage meter machine must be repaired or replaced.

Figure 2A:
FIG. 2a shows a structure for a ring buffer with memory cells for five datasets in accordance with the invention in the status before the writing of dataset 15.
Figure 2B:
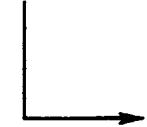
FIG. 2b shows a structure for a ring buffer with memory cells for five datasets in accordance with the invention in the status after the writing of dataset 15.

FIGS. 2a and 2b each show a structure for statuses of a ring buffer 3 with memory cells. For simplicity, only memory cells for five (n=5) datasets out of x datasets are shown. Typically, the five stored datasets are entered in direct succession. The memory cell that, for example, was written at a time when a voltage outage occurred usually contains unusable data. The memory cell to which the pointer points therefore cannot be read from, but only written into.

This is the third call, containing the dataset 9, in the example of a structure for a ring buffer with memory cells in the status before the write-in of the dataset 15 shown in FIG. 2a. The service technician can thus read out and interpret the datasets 10 through 14.

In the example following the write-in of the dataset 15 shown in FIG. 2b the pointer 21 now points to the fourth cell, containing the dataset 10. The service technician can thus read out and interpret only the datasets 11 through 15. The microprocessor 30 is correspondingly programmed to ignore this dataset to which the first pointer Z1 points for any and all read accesses. The readout of a dataset from the other memory cells, to which the second pointer Z2 points, however, is enabled. When the provided memory area is fully written and the end of the memory area is reached, a branch is made back to the start and the dataset wich was entered first (i.e., the oldest dataset) is overwritten. At least one first pointer counter contains a first pointer Z1 that points to the memory cell of the last dataset (or, after incrementation) to the memory cell of the next dataset to be written. The incrementation ensues with a processor instruction. Preferably, the first pointer Z1 is stored in an other memory cell, cell Z, of the read-write memory 39 for non-volatile storage.

As a result of further inventive measures, it is extremely improbable that the counter reading will be destroyed by an abort or will be modified to an incorrect reading, thereby further enhancing the data integrity. A correct access to the datasets in the memory cells would not be possible given an incorrect counter reading Z1 of the first pointer counter. Inventively, the incrementation is undertaken by the microprocessor 30 in a clock cycle. As a result, the time span becomes so short that it would be extremely improbable for the counter reading to be incremented precisely during a voltage interruption. For example, the pointer counter has a size of 1 byte—which already reduces the probability of an error—and a specific technique is employed for a defined stopping of the microprocessor system given a voltage outage, so that it is completely certain that the counter reading is not destroyed or influenced given a voltage outage. The technique employed for a defined stopping of the microprocessor system given voltage outage is hardware-based and assures that at least the instruction being processed by the processor at the moment can always be completely carried out to the end. The aforementioned hardware can be a component of the microprocessor 30 or can be a separate assembly that is connected to the microprocessor 30.

The method for improving the data integrity with a ring buffer is based on a microprocessor that, together with a program memory, forms the ring buffer in which at least one of the memory areas of a non-volatile read-write memory is administered by a pointer counter and a specific number of identical datasets is stored in the memory area, whereby a ring buffer that can be read out and written arises in the non-volatile read-write memory 39. The method includes the following steps:

A dataset is written into a selected memory cell of the ring buffer, which is composed of a number of memory cells for conventional operation and is expanded by one memory cell.

The oldest dataset 15 is overwritten in a write operation and the pointer counter reading of a first pointer Z1 is incremented after the new dataset has been written into the memory cell in which the oldest dataset was previously located, so that the first pointer Z1 now points to a memory cell having what is now an oldest dataset, that can be overwritten in the next write operation.

Readout of the respective memory cell to which the pointer Z1 points is prevented.

The incrementing of the counter reading is likewise implemented within a single clock cycle by a processor instruction. A readout of a dataset from one of the memory cells can be implemented following the aforementioned overwriting, causing the readout of a dataset from a memory cell to which the pointer Z1 is not currently pointing and to which a second pointer Z2 currently points.

Given a voltage outage, a complete processing of the instruction being processed by the processor at the moment ensues. Further, a defined stopping of the microprocessor system is provided given a voltage outage.

A flowchart for the operation of the ring buffer is shown according to FIG. 3. Such a routine can be called at any time, for example immediately after start-up during an initialization routine, as well as during ongoing operation of the postage meter machine. In a routine of the postage meter machine which begins due to an event, for example, an automatic data input into the volatile main memory RAM 40, is undertaken in a step 401. For example, such an event can be the finding of an error or an interrogation of such an error that is already non-volatilely stored. A determination is made in a step 402 as to whether a dataset is to be written. When this is the case, a branch is made to a step 403. When, however, this is not the case, a branch is made to a step 409 to determine which dataset is to be read. Subsequently, a determination of the address ensues in a step 410 for that memory cell in which the desired dataset resides. A sub-routine assures that the dataset to which the pointer Z1 points is not accessed. A check is carried out in the sub-routine (not shown) as to whether the pointer (counter) reading Z2 is the same as the pointer reading Z1 in order to branch to an error mode as warranted and/or to automatically increment the pointer reading of the second pointer Z2 for the purpose of addressing another memory cell. If the pointer reading Z2 identified in the sub-routine of the step 410 was unequal to the pointer reading Z1, a branch is made to the readout of the desired dataset in the following step 411. The point S of the system routine is subsequently reached in order to enable the further program execution, or the operation of the postage meter machine, as provided.

If, however, it was found in the step 402 that a dataset is to be written, a branch is made to the step 403 in order to fetch the pointer reading of the first pointer Z1 from the memory cell Z of the non-volatile memory 39. The appertaining memory cell to which the first pointer Z1 is pointing can thus be addressed from the memory cells 1 through N+1 of the non-volatile memory 39. The oldest dataset located in the memory cell addressed in this way can now be overwritten with a new dataset. For example, the new dataset can be a current dataset with error information that does not lead to the shut down of the entire postage meter machine. A check is also carried out in the step 403 to determine whether the aforementioned overwriting was in fact carried out. After processing the step 403, a check is carried out in the step 404 to determine whether the aforementioned overwriting in step 403 was in fact successfully implemented. When this is the case, a branch is made to a step 405 in order to increment the pointer reading of the pointer Z1 and in order to subsequently store this in the memory cell Z of the non-volatile memory 39. If, however, this is not the case, a branch is made from the step 404 to a step 406 in order to implement an error routine. For example, a renewed attempt to overwrite the oldest dataset or the second-oldest dataset in the step 403 before an error message ensues can be a component of this error routine. As a result of the implementation of the step 405 with storage of the pointer reading of the pointer 21, an interrogation is made in the following, step 407 to determine whether the end of the addressing of the memory cells of the ring buffer 3 has been reached. When the pointer reading of the pointer Z1 is beyond the end of the ring buffer 3, i.e. the end of the addressing of the memory cells of the ring buffer 3 has been reached, a branch is made to a step 408. Otherwise, a branch is made to the point S. A resetting of the pointer reading of the pointer Z1 to the start of the ring buffer 3, including storage thereof, ensues in the step 408.

After the aforementioned overwriting in the step 403 and after carrying out the aforementioned, further steps, a further pointer Z2 again enables a readout of a dataset from one of the memory cells in a step 411, i.e. from a memory cell to which the pointer Z1 is not currently pointing.

It is alternatively possible to decrement, rather than increment, the counter for the pointer Z1 that in the step 405 and to provide a positive interrogation in the step 407 when the start (rather than the end) of the addressing of the memory cells of the ring buffer 3 has been reached. Consequently, the pointer reading of the pointer Z1 must be set to the end of the ring buffer 3 in the step 408.

It is also within the scope of the invention for any existing dataset, instead of the oldest dataset, to be overwritten as an alternative.

Although modifications and changes may be suggested by those skilled in the art, it is the intention of the inventor to embody within the patent warranted hereon all changes and modifications as reasonably and properly come within the scope of his contribution to the art.

I claim as my invention:

1. An apparatus for improving data integrity comprising:

a ring buffer for storing N datasets formed in a non-volatile read-write memory, said ring buffer comprising N+1 memory cells of said non-volatile read-write memory;

pointer counter means for storing a count identifying a pointer which cyclically designates one of said memory cells of said ring buffer;

means for controlling writing of respective datasets into said respective memory cells of said ring buffer and for controlling said pointer counter for causing said pointer to point to a memory cell of said ring buffer containing an oldest dataset for causing said oldest dataset in said memory cell to which said pointer counter is pointing to be overwritten, and for thereafter incrementing said count of said pointer counter means for causing said pointer to point to a different memory cell of said ring buffer having a dataset therein that is now the oldest dataset, to be overwritten in a next write operation; and means for precluding access to the memory cell to which said pointer is pointing for any read operation.

2. An apparatus as claimed in claim 1 wherein said means for incrementing count of said pointer counter means operates with a clock signal having a plurality of successive clock cycles and wherein said count is incremented within one clock cycle, and further comprising hardware means for assuring complete processing of an instruction being processed by said means for controlling.

3. An apparatus as claimed in claim 1 further comprising means for forming a further pointer administered by a further pointer counter means for reading out of said datasets from the respective memory cells.

4. An apparatus as claimed in claim 3 wherein said further pointer counter means comprises a portion of said non-volatile read-write memory.

5. An apparatus as claimed in claim 3 wherein said further pointer counter means comprises a part of a memory separate from said non-volatile read-write memory connected to said means for controlling.

6. An apparatus as claimed in claim 3 wherein said means for controlling includes a program memory containing software for programming said means for controlling to form said further pointer counter means.

7. An apparatus as claimed in claim 1 wherein said means for controlling includes a program memory containing software for programming said means for controlling to form said pointer counter means.

8. An apparatus as claimed in claim 1 wherein said non-volatile read-write memory contains a further memory cell, in which said pointer is stored.

9. A method for improving data integrity comprising:

forming a ring buffer in a non-volatile read-write memory, said ring buffer comprising N+1 memory cells of said non-volatile read-write memory;

storing N datasets individually in a portion of said N+1 memory cells of said ring buffer;

storing a count identifying a pointer which cyclically designates one of said memory cells of said ring buffer;

controlling writing of respective datasets into said respective memory cells of said ring buffer by causing said pointer to point to a memory cell containing an oldest dataset and overwriting said oldest data set in said memory cell to which said pointer counter is pointing, and thereafter incrementing said count for causing said pointer to point to a different memory cell having a dataset therein that is now the oldest dataset, to be overwritten in a next write operation; and precluding access to the memory cell to which said pointer is pointing for any read operation.

10. A method as claimed in claim 9 wherein comprising incrementing said count with a clock signal having a plurality of successive clock cycles and incrementing said count within one clock cycle, and assuring complete processing of an instruction being processed in controlling writing of respective datasets.

11. A method as claimed in claim 9 further comprising forming a further pointer for reading out of said datasets from the respective memory cells.

12. A method as claimed in claim 11 comprising forming a pointer counter for said further pointer in a portion of said non-volatile read-write memory.

13. A method as claimed in claim 11 comprising forming a pointer counter for said further printer in a part of a memory separate from said non-volatile read-write memory.

14. A method as claimed in claim 11 comprising forming a pointer counter for said further pointer by software stored in a processor which controls writing the respective datasets into said ring buffer.

15. A method as claimed in claim 11 comprising forming a pointer counter for said pointer by software stored in a processor which controls writing the respective datasets into said ring buffer.

16. A method as claimed in claim 9 comprising storing said pointer in a further memory cell of said non-volatile read-write memory.

* * * * *